US006793091B2

(12) United States Patent
Hagano et al.

(10) Patent No.: US 6,793,091 B2
(45) Date of Patent: Sep. 21, 2004

(54) TANK CAP

(75) Inventors: Hiroyuki Hagano, Aichi-ken (JP); Masayuki Nakagawa, Aichi-ken (JP)

(73) Assignee: Toyoda Gosei Co., LTD, Aichi-ken (JP)

( * ) Notice: Subject to any disclaimer, the term of this patent is extended or adjusted under 35 U.S.C. 154(b) by 137 days.

(21) Appl. No.: 10/103,142

(22) Filed: Mar. 22, 2002

(65) Prior Publication Data

US 2002/0139801 A1 Oct. 3, 2002

(30) Foreign Application Priority Data

Mar. 30, 2001 (JP) ....................................... 2001-098088

(51) Int. Cl.[7] ................................................ B65D 53/00

(52) U.S. Cl. ............................... 220/304; 220/DIG. 33; 220/86.2

(58) Field of Search ......................... 220/304, DIG. 33, 220/86.2, 89.1

(56) References Cited

U.S. PATENT DOCUMENTS

| | | | | | |
|---|---|---|---|---|---|
| 4,779,755 A | * | 10/1988 | Harris | 220/203.21 |
| 5,183,173 A | * | 2/1993 | Heckman | 220/203.07 |
| 5,638,975 A | * | 6/1997 | Harris | 220/288 |
| 6,179,148 B1 | * | 1/2001 | Harris | 220/288 |
| 6,206,219 B1 | * | 3/2001 | Bruggenolte | 220/230 |
| 6,308,852 B1 | | 10/2001 | Hagano et al. | |
| 6,325,233 B1 | * | 12/2001 | Harris | 220/288 |
| 6,568,553 B2 | * | 5/2003 | Hagano et al. | 220/304 |
| 2002/0066734 A1 | * | 6/2002 | Harris | 220/304 |

FOREIGN PATENT DOCUMENTS

| | | | | |
|---|---|---|---|---|
| JP | A-10-329861 | | 12/1998 | |
| JP | 2000-344266 | | 12/2000 | |
| JP | 2002-299357 A | * | 10/2002 | 220/304 |

OTHER PUBLICATIONS

U.S. patent application Ser. No. 10/302,988, Hagano et al., filed Nov. 25, 2002.

* cited by examiner

*Primary Examiner*—Robin A. Hylton
(74) *Attorney, Agent, or Firm*—Posz & Bethards, PLC

(57) ABSTRACT

A fuel cap is equipped with the torque mechanism 80. The torque mechanism 80 comprises the handle engagement element 46*a* formed on the cover 40; the torque plate 90, having the torque piece engagement element 94*b*; and a spring. When the cover 40 is rotated in the closing direction, the handle engagement element 46*a* disengages from torque piece engagement element 94*b* and the engagement gives the user a feeling of attachment by an audible click. At that time, elastic torque piece 94 elastically deforms so that the handle engagement vertical surface 46*b* is pushed in the radial direction by the engaging vertical surface 94*d*, a slot 94*c*. Conversely, when the cap is rotated in the opening direction, the engaging inclined surface 46*c* pushes the engaging inclined surface 94*e* and elastic torque piece 94 inclines with the support end 94*a*, and thus the cap transitions to a non-engaged state, and the cover 40 is returned to an initial position relative to the casing main body 20. The fuel cap closes the fuel tank fueling inlet with a small value of rotating torque, the disengaging force used for tightening or untightening the cap is small, and operating noise is reduced.

12 Claims, 15 Drawing Sheets

TANK CAP

This application claims the benefit of and priority from Japanese Application No. 2001-98088 filed Mar. 30, 2001, the content of which is incorporated herein by reference.

BACKGROUND OF THE INVENTION

1. Field of the Invention

The present invention relates to a tank cap, having a torque mechanism for closing the opening of a tank with a predetermined rotational torque.

2. Description of the Related Art

One example of known tank caps is described in JP No. 2000-344266A. As shown in FIG. 15, a fuel cap 100 comprises a casing main body 110, a handle 120, and a torque mechanism 130. The torque mechanism 130 comprises handle engagement elements 122 formed on the handle 120, a torque plate 140 having torque piece engagement elements 142, and a spring 132. When the handle 120 is rotated in the closing direction, the handle engagement elements 122 engage with the torque piece engagement elements 142 and disengage with the torque piece engagement elements 142, giving the user a feeling of attachment by an audible click (first non-engaged state). At this time, the spring accumulates the pressing force applied in the opening direction.

The pressing force accumulated in the spring causes the handle engagement elements 122 to disengage with the torque piece engagement elements 142 with a small rotational torque (second non-engaged state). The handle 120 returns to an initial position relative to the casing main body 110.

However, in the conventional the fuel cap 100, the rotational torque for the handle engagement, element 122 to disengage torque piece engagement elements 142 is large. The rotational torque is particularly large when transitioning to the second non-engaged state, resulting in the problem of a large noise, which is hard on the ears, being caused by the operation.

SUMMARY OF THE INVENTION

The object of the present invention is thus to provide a tank cap which can close a tank opening with a small value of rotating, has outstanding operability such as in regard to alignment for opening and closing, and also has reduced operating noise during opening and closing.

At least part of the above and the other related objects are obtained by a tank cap configured to open and close a tank opening and to engage with an opening engagement element disposed on a circumference of the tank opening.

The tank cap comprises a casing main body for sealing the tank opening, the casing main body including a casing engagement element configured to engage with the opening engagement element via rotation of the casing main body by a predetermined angle; a handle rotatably mounted on the casing main body; and a torque mechanism interposed between the handle and the casing main body, the torque mechanism including (i) a handle engagement element disposed on a lower portion of the handle and (ii) an elastic torque piece with a torque piece engagement element engaging wish the handle engagement element, the elastic torque piece configured to transmit rotational torque applied to the handle to the casing main body via engagement between the handle engagement element and the torque piece engagement.

The torque piece engagement element is configured to be selectively put one of in an engagement state, a first non-engaged state, and a second non-engaged state. In the engagement state, the torque piece engagement element engages with the handle engagement element so that the rotational torque applied to the handle is transmitted to the casing main body via the elastic torque piece when the handle is rotated in a closing direction of the tank opening. In the first non-engaged state, the torque piece engagement element is released from the handle engagement element with a first force due to a first rotational torque when the torque piece engagement element engages with the handle engagement element, and then the handle is rotated in the closing direction of the tank opening. In the second non-engaged state after being in the first non-engaged state, the torque piece engagement element is released from the handle engagement element with a second force due to a second rotational torque when the torque piece engagement element engages with the handle engagement element, and then the handle is rotated in the opening direction of the tank opening, a direction of the second force being different from that of the first force, and the second force being less than the first force.

With the tank cap of the present invention, when the handle is rotated in the closing direction, aligning the casing engagement element of the casing main body to the opening engagement element of the tank opening, the casing main body, via the torque mechanism, rotates as a unit with the handle and the casing engagement element engages the opening engagement element. At this time, when the torque piece engagement element of the torque mechanism goes into the engaged state where it engages with the handle engagement element of the handle, the rotational torque applied to the handle is transmitted to the casing main body. When the rotational torque exceeds a predetermined value and the torque piece engagement element disengages with the handle engagement element to change the first non-engaged state, the user can receives a feeling of attachment by an audible click and confirms that the cap has been closed with the predetermined torque.

On the other hand, in the state where the tank cap has closed the tank opening, when the rotational torque is applied to the handle in the opening direction, the handle engagement element and torque piece engagement element go into the second non-engaged state to disengage by means of a smaller torque than with the first non-engaged state. That is, the rotating force in the closing direction returns the positional relationship between the handle engagement element and the torque piece engagement element to an initial position. Thus, when the tank cap is to be closed again, the positional relationship of the torque piece engagement element and handle engagement element is fixed and alignment for closing the tank opening is facilitated.

Since the elastic deformation direction of the elastic torque piece is a different direction for first non-engaged state and for second non-engaged state, the cap allows a greater degree of freedom. For example, the torque mechanism can be easily designed such that the elastic torque piece has the elastic deformation of second non-engaged state markedly smaller than that of the first non-engaged state.

In accordance with a preferred embodiment of the present invention, the torque mechanism comprises a torque plate interposed between the handle and the casing main body.

In accordance with another preferred embodiment of the present invention, the torque mechanism is configured that the first force is applied to the torque piece engagement element from a radial direction relative to an axial direction of the tank cap, and the second force is applied to the torque piece engagement element from the axial direction.

In accordance with still another preferred embodiment of the present invention, the handle engagement element includes a first engaging vertical surface, and the torque piece engagement element includes an engaging vertical surface conforming to the engaging vertical surface, the elastic torque piece being configured to deform by the first force when the handle is rotated in the closing direction, and wherein the handle engagement element includes an engaging inclined surface inclined by a predetermined angle relative to the axial direction, and the torque piece engagement element includes an engaging inclined surface conforming to the engaging inclined surface, the elastic torque piece being configured to deform by the second force when the handle is rotated in the opening direction.

In accordance with another preferred embodiment of the present invention, wherein the elastic torque piece is a cantilevered piece, the cantilevered piece being configured to deform more significantly in the second non-engaged state than in the first non-engaged state when the torque piece engagement element is pressed against the handle engagement element.

In accordance with still another preferred embodiment of the present invention, the torque mechanism includes a torque plate interposed between the handle and the casing main body, the elastic torque piece having the torque piece engagement element.

In accordance with another preferred embodiment of the present invention, the torque mechanism further comprises a spring, the spring generating a pressing force to return a positional relationship between the handle and the casing main body to an initial state.

In accordance with another preferred embodiment of the present invention, the spring is a coil spring that accumulates the pressing force when being twisted.

In accordance with another preferred embodiment of the present invention, the spring is interposed between the handle and the torque plate, the spring accumulating the pressing force in response to a rotation of the handle in the opening direction of the tank opening, the pressing force accumulated in the spring being released so that the first non-engaged state is changed to the second non-engaged state.

In accordance with another preferred embodiment of the present invention, the spring is interposed between the casing main body and the torque plate, the spring accumulating the pressing force in response to a rotation of the handle in the closing direction of the tank opening, the pressing force accumulated in the spring being released so that the second non-engaged state is changed to the initial state.

In accordance with another preferred embodiment of the present invention, the elastic torque piece is integrally formed on the casing main body.

In accordance with another preferred embodiment of the present invention, the elastic torque piece includes a leg projecting from an upper portion of the casing main body and a cantilevered arm integrally formed with an upper portion of the leg, the cantilevered arm being disposed to have a gap between the cantilevered arm and the casing main body.

In accordance with another preferred embodiment of the present invention, the tank opening is a fuel supply inlet of a fuel tank mounted on an automobile.

The present invention is also directed to a tank cap configured to open and close a tank opening and to engage with an opening engagement element disposed on a circumference of the tank opening, the tank cap comprises a casing main body for sealing the tank opening, the casing main body including a casing engagement element configured to engage with the opening engagement element via rotation of the casing main body by a predetermined angle;

a handle rotatably mounted on the casing main body; and a torque mechanism interposed between the handle and the casing main body, the torque mechanism including (i) a handle engagement element disposed on a lower portion of the handle and (ii) an elastic torque piece with a torque piece engagement element engaging with the handle engagement element, the elastic torque piece configured to transmit rotational torque applied to the handle to the casing main body, wherein, when a first rotational force is applied to the handle by a user in a first rotational direction in order to attach the casing main body in the tank opening, the handle engagement element engages with the torque piece engagement element, and then the elastic torque piece is deformed to release the engagement between the handle engagement element and the torque piece engagement element when the first rotational force causes a first stress exceeding a first value between the handle engagement element and the torque piece engagement element, and wherein, when a second rotational force is applied to the handle in a second rotational direction opposite from the first rotational direction, the handle engagement element engages with the torque piece engagement element, and then the elastic torque piece is deformed to release the engagement between the handle engagement element and the torque piece engagement element when the second rotational force causes a second stress exceeding a second value between the handle engagement element and the torque piece engagement element, the second value being less than the first value, and the direction of the first stress being different from that of the second stress.

DESCRIPTION OF THE PREFERRED EMBODIMENTS

Figure 1:
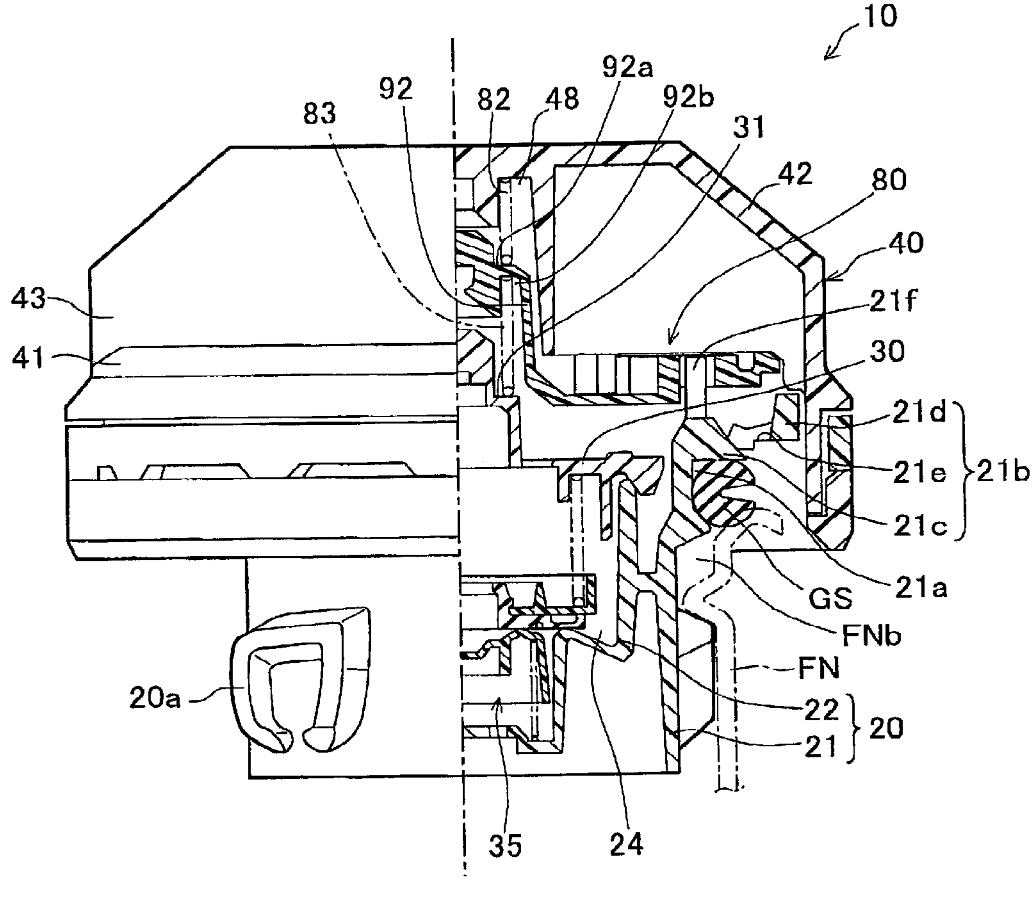
FIG. 1 is a partial cross sectional view showing a fuel cap according to a first embodiment of the present invention.

FIG. 1 is a partial cross-sectional view showing a fuel cap 10 (tank cap) according to one embodiment of the present invention. In FIG. 1, the fuel cap 10 is mounted on a filler neck FN having a fueling inlet FNb (tank opening) for supplying fuel to a fuel tank not shown in the figure. The fuel cap 10 comprises a casing main body 20 made of a resin material such as polyacetal resin; a cover 40 having a handle and formed of a resin material such as nylon and mounted on an upper part of the casing main body 20; an inner cover 30 defining a valve chamber 24 by closing an upper opening of the casing main body 20; a pressure regulating valve 35 accommodated in the valve chamber 24; a torque mechanism 80; and a gasket as mounted on an upper portion of the casing main body 20 for sealing against the filler neck FN.

The elements of the tank cap 10 in the embodiment are described in detail below. The casing main body 20 comprises a substantially cylindrical outer tubular body 21 with a casing engagement element 20*a* which engages with an inner circumference of the filler neck FN, and a valve chamber forming body 22 provided on an inner side of the outer tube 21. The valve chamber forming body 22 accommodates a positive pressure valve and a negative pressure valve which together operate as a pressure control valve. The inner cover 30, which is welded to an upper portion of the valve chamber forming body 22 by ultrasonic welding, covers the valve chamber 24.

The gasket as is mounted on a lower surface of a flange part 21*b* formed on an upper portion of the casing main body 20. The gasket as is interposed between a seal support 21*a* of the flange part 21*b* and the fueling inlet FNb of the filler neck FN and, when the fuel cap 10 is tightened down on the fueling inlet FNb, the gasket GS pushes against a seal surface of the fueling inlet FNb and provides a seal.

Figure 2:
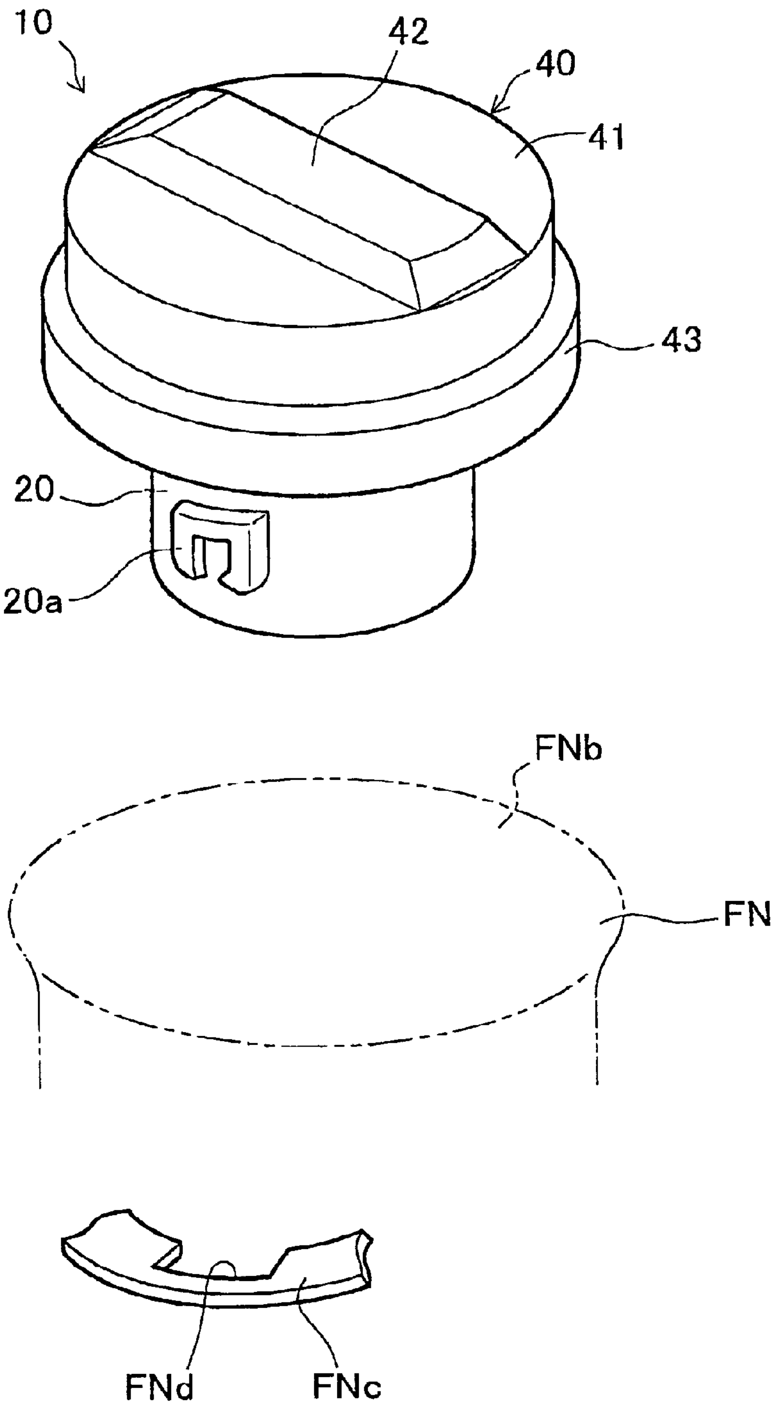
FIG. 2 shows the relationship between a casing engagement element of a casing main body and a filler neck.

In addition, the casing engagement element 20*a* is formed on the lower part of the outer surface of outer tube 21. FIG. 2 shows the relationship between the casing engagement element 20*a* of the casing main body 20 and the filler neck FN. As shown in FIG. 2, an opening engagement element FNc is formed on the inner circumference of the filler neck FN. On one part of the inner circumference of the opening engagement element FNc, a neck insertion notch FNd is formed, enabling insertion of the casing engagement element 20*a* in the axial direction. As a result, in the state where the casing engagement element 20*a* is aligned with the neck insertion notch FNd and the fuel cap 10 is inserted into the filler neck FN, the fuel cap 10 is rotated the predetermined angle (approximately 90 degrees), the casing engagement element 20*a* engages with the opening engagement element FNc, and in this way, the fuel cap 10 is attached to the filler neck FN.

As shown in FIG. 1, the flange part 21*b* comprises an inner annularly shaped part 21*c* formed on the upper part of outer tube 21, an outer annularly shaped part 21*d* positioned toward the outside of the inner annularly shaped part 21*c*, and connecting parts 21*e* which connect the inner annularly shaped part 21*c* and the outer annularly shaped part 21*d* at four points along the circumference.

The cover 40 is rotatably mounted on the flange part 21*b*. The cover 40 comprises an upper wall 41, a handle 42 formed protrudingly from the upper surface of the upper wall 41, and a side wall 43 formed at the outer circumference of the upper wall 41, and is integrally formed by injection molding of electrically conductive resin. In addition, on the inside of the side wall 43, eight engaging protrusions (not shown) are formed at equal intervals along the circumferential direction of the cover 40. The engaging protrusions engage with the outer annularly shaped part 21*d* of the flange part 21*b*, and the cover 40 is thus assembled to the casing main body 20.

Figure 3:
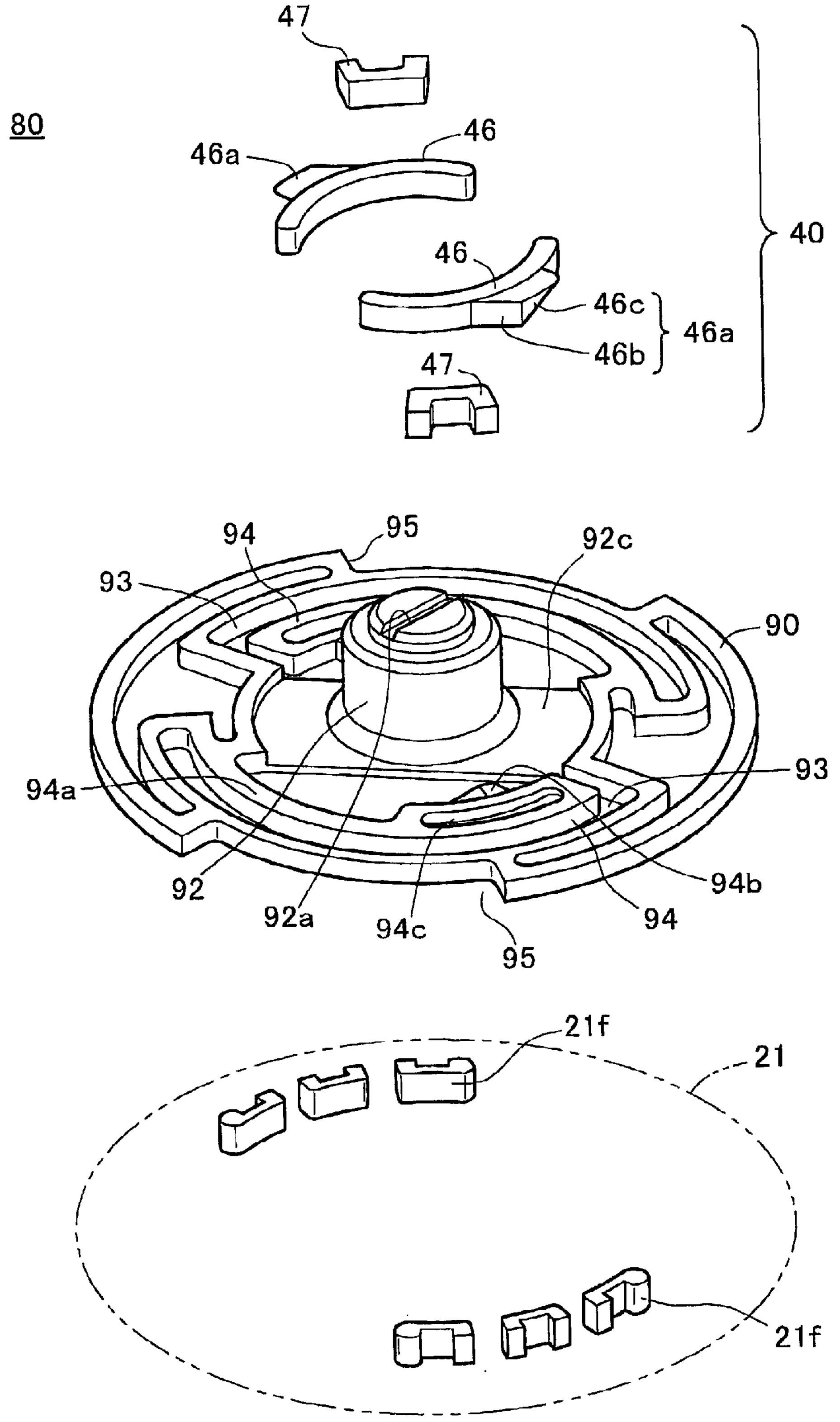
FIG. 3 is an oblique-view exploded view showing a torque mechanism interposed between a handle and an upper portion of the casing main body.
Figure 4:
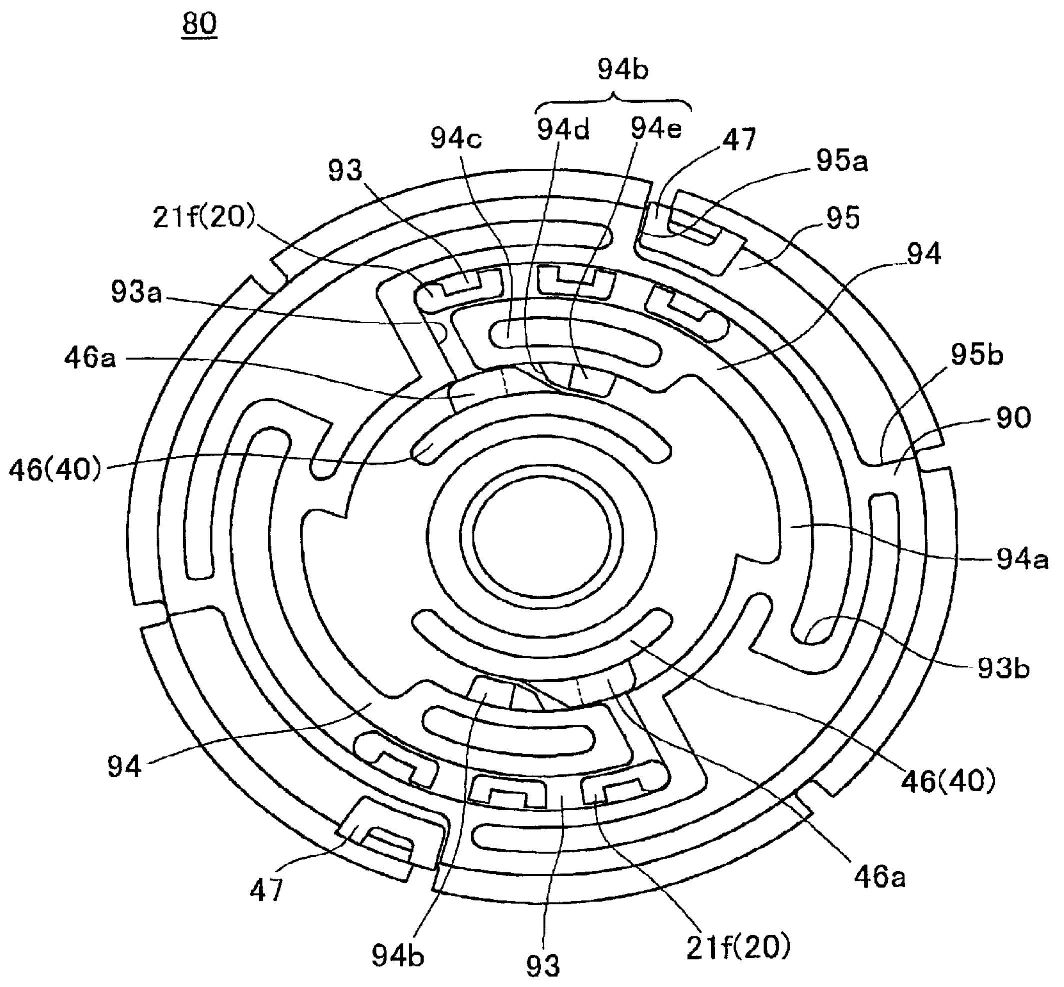
FIG. 4 is a descriptive view showing the torque mechanism viewed from above.

FIG. 3 is an oblique view showing the torque mechanism 80 interposed between the cover 40 and the upper portion of the casing main body 20 and FIG. 4 shows the torque mechanism 80 viewed from above. The torque mechanism 80 gives the user a feeling of attachment by an audible click when the rotational torque of a predetermined level or more is applied to the cover 40 when closing the fuelling inlet FNb with the tank cap 10. The user can thus confirm that the tank cap 10 is attached to the filler neck FN with the rotational torque of the predetermined level or more.

As shown in FIG. 3 and FIG. 4, the torque mechanism 80 includes main body ribs 21*f* and 21*f* separated in three ribs and formed on the upper surface of the outer tube 21, handle engagement elements 46*a* and 46*a* formed on the arc-shaped turning parts 46, and handle trigger protrusions 47 and 47. The torque mechanism 80 further comprises a first spring 82 and a second spring 83, as shown in FIG. 1, and a torque plate 90.

Figure 5:
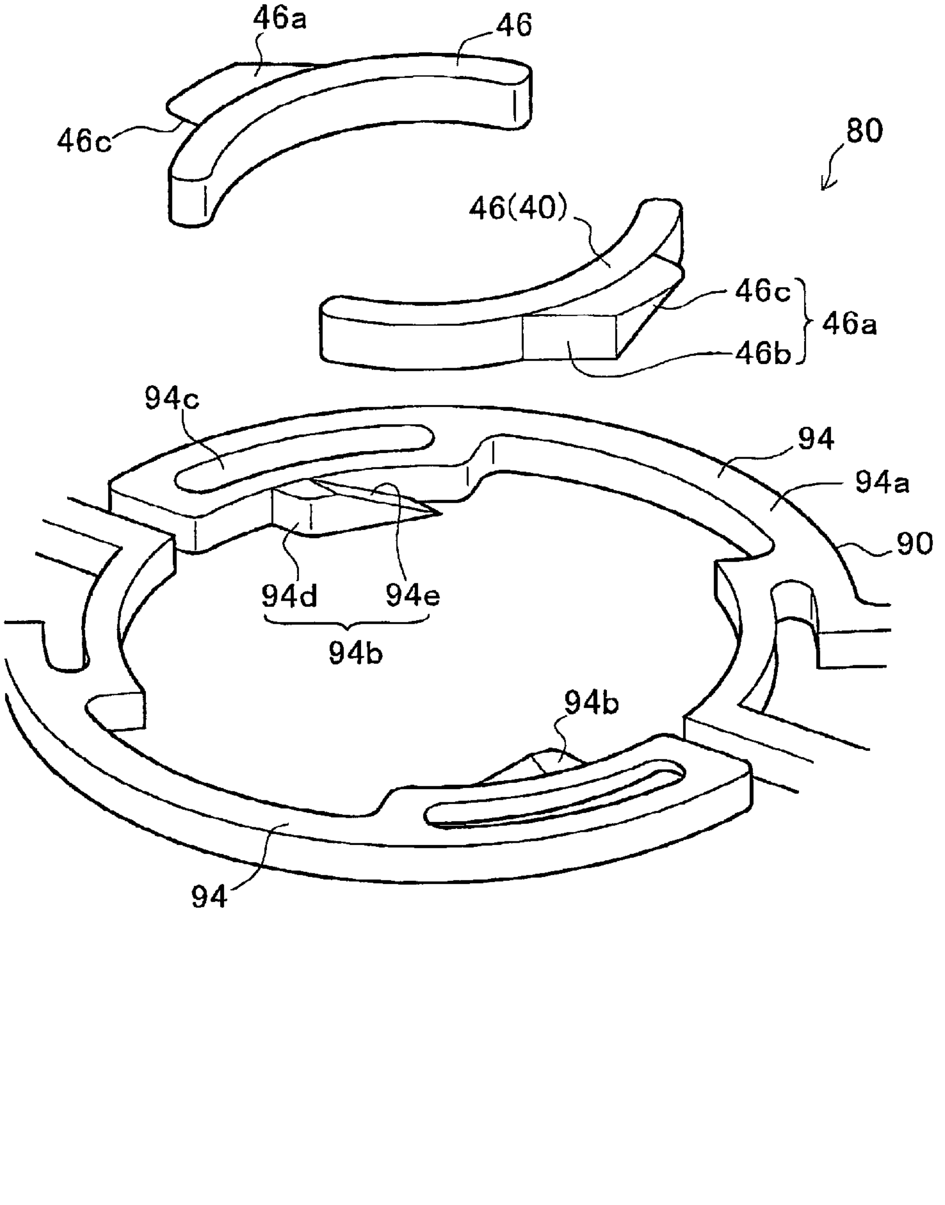
FIG. 5 is a partial enlarged oblique view of FIG. 3.

In other words, in the central part of the inner side of the cover 40, the arc-shaped turning parts 46 and 46 are protrudingly formed and, on the outer periphery of the arc-shaped (turning parts 46 and 46, the handle engagement elements 46*a* and 46*a* are protrudingly formed. FIG. 5 is a partial oblique view that is enlarged in-with respect to FIG. 3. As shown in FIG. 5, a side surface of the handle engagement elements 46*a* is formed as an engaging vertical surface 46*b* which is formed vertically. A lower face of the handle engagement element 46*a* is formed as an engaging inclined surface 46*c* which is inclined by a predetermined angle relative to the axis of the fuel cap 10.

In addition, on the outer periphery of the inner face of the cover 40 shown in FIG. 3, arc shaped handle trigger protrusions 47 and 47 are protrudingly formed. The handle engagement elements 46*a* and 46*a* and the handle trigger protrusions 47 and 47 are formed on the cover 40 symmetrically centered on the axis of the cover 40.

Referring to FIG. 4, the torque plate 90 is a thin disk made of resin and has a central protruding part and guides slots. The torque plate 90 has a cup-shaped, spring-containing protruding part 92(see FIG. 1), a pair of rib giudes 93 and 93 arranged concentrically with the protruding part 92, and a pair of trigger guide slots 95 and 95. On the outer periphery of the spring-containing protruding part 92, the arc-shaped turning parts 46 of the cover 40 are positioned and also at the outer edge of the parts 46, elastic torque pieces 94 and 94 are disposed. Each elastic torque piece 94 is a cantilever arc piece that extends from a support end 94*a*, and has a torque piece engagement element 94*b* that protrudes toward the center of the torque plate 90 and a slot 94*c* formed on the outer circumferential side of the torque piece engagement element 94*b*. The elastic torque piece 94 is elastically deformed to narrow the slot 94*c*, when the torque piece engagement element 94*b* is pressed against the handle engagement element 46*a* of the cover 40. The spring-containing protruding part 92 has connecting parts 92*c* extending on opposing sides therefrom. The connecting parts 92*c* connect the protruding part 92 with the base of the elastic torque pieces 94 and 94.

As shown in FIG. 5, the torque piece engagement element 94*b* has an engaging vertical surface 94*d* and an engaging inclined surface 94*e*. The engaging vertical surface 94*d* is formed so as to contact the handle engagement vertical surface 46*b* perpendicularly with respect to the rotational direction of the torque plate 90 when the handle engagement element 46a pushes the torque piece engagement element 94*b* in the radial direction due to the closing operation, and then the torque piece engagement element 94*b* elastically deforms to narrow the slot 94*c* (see FIG. 9).

On the other hand, the engaging inclined surface 94*e* is formed to contact the engaging inclined surface 46*c* when the handle engagement element 46*a* pushes the torque piece engagement element 94*b* due to movement of the opening direction, and the torque piece engagement element 94*b* elastically inclined downward at fulcrum of the support end 94*a*.

In FIG. 4, the main body ribs 21*f* and 21*f* are each inserted into the rib guides 93 and 93 disposed peripherally from the elastic torque pieces 94 and 94. Each of the main body ribs 21*f* moves back and forth between a first end 93*a* and a second end 93*b* which are the two ends of the rib guide 93. Likewise, the handle trigger protrusions 47 and 47 are inserted into the trigger guide slots 95 and 95. Each handle trigger protrusion 47 moves back and forth between a first end 95*a* and a second end 95*b* which are two ends of the trigger guide slot 95.

In FIG. 1, the first spring 82 and the second spring 83, used as a torsion springs, are disposed connectively between the cover 40 and the torque plate 90 and between the torque plate 90 and the inner cover 30 fixed to the casing main body 20, respectively.

That is, the first spring 82 is spanned between a fixing stopper 48 formed on the center of the lower surface of the cover 40, and a fixing stopper 92*a* formed on the upper wall of the spring containing protruding part 92. In this way, when the cover 40 is rotated in the clockwise direction relative to the torque plate 90, the spring 82 accumulates spring force.

The second spring 83 is spanned between a fixing stopper 92*b* formed on the lower wall of the spring containing protruding part 92, and a fixing point 31 formed on the upper surface of the inner cover 30. In this way, when the cover 40 and the torque plate 90 are rotated as a single body in the counter-clockwise direction relative to the casing main body 20, the spring 83 accumulates spring force.

Figure 11:
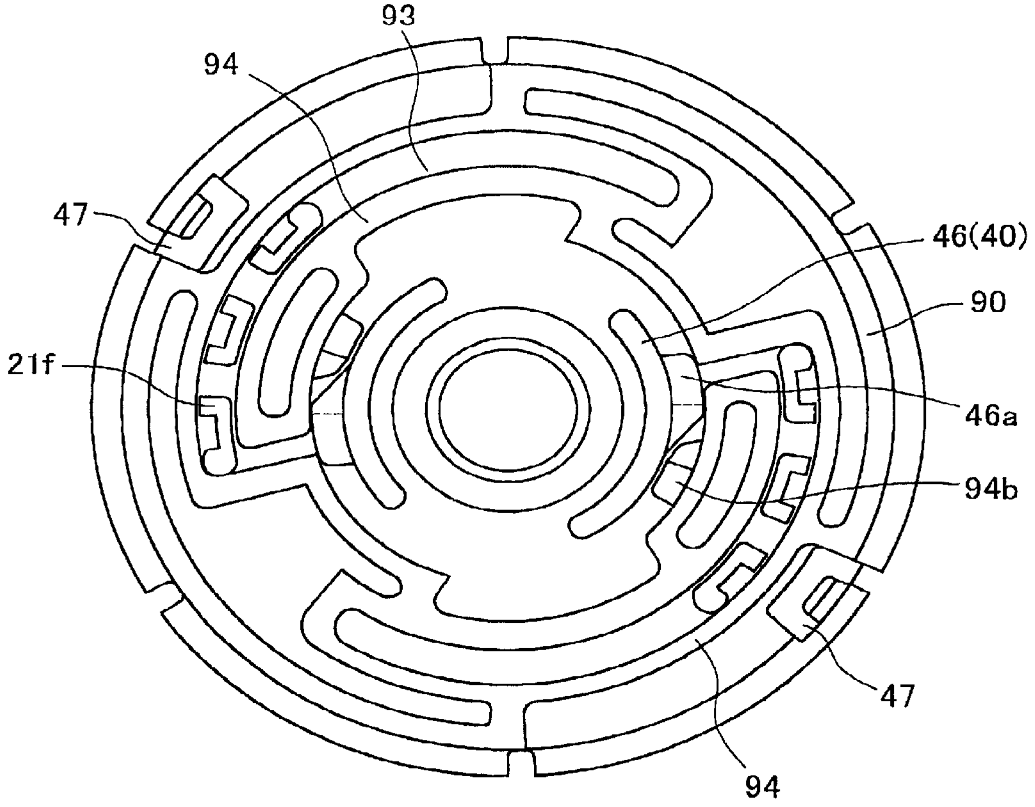
FIG. 11 shows the action continuing from that of FIG. 10.
Figure 12:
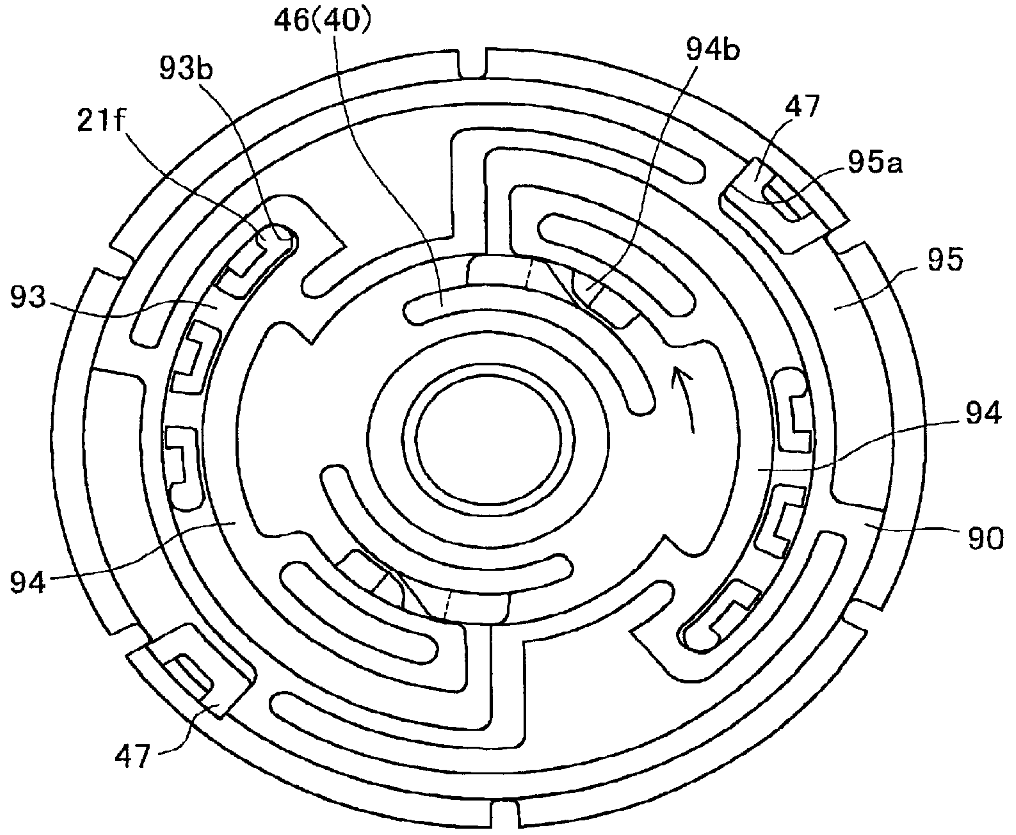
FIG. 12 shows the action continuing from that of FIG. 11.
Figure 13:
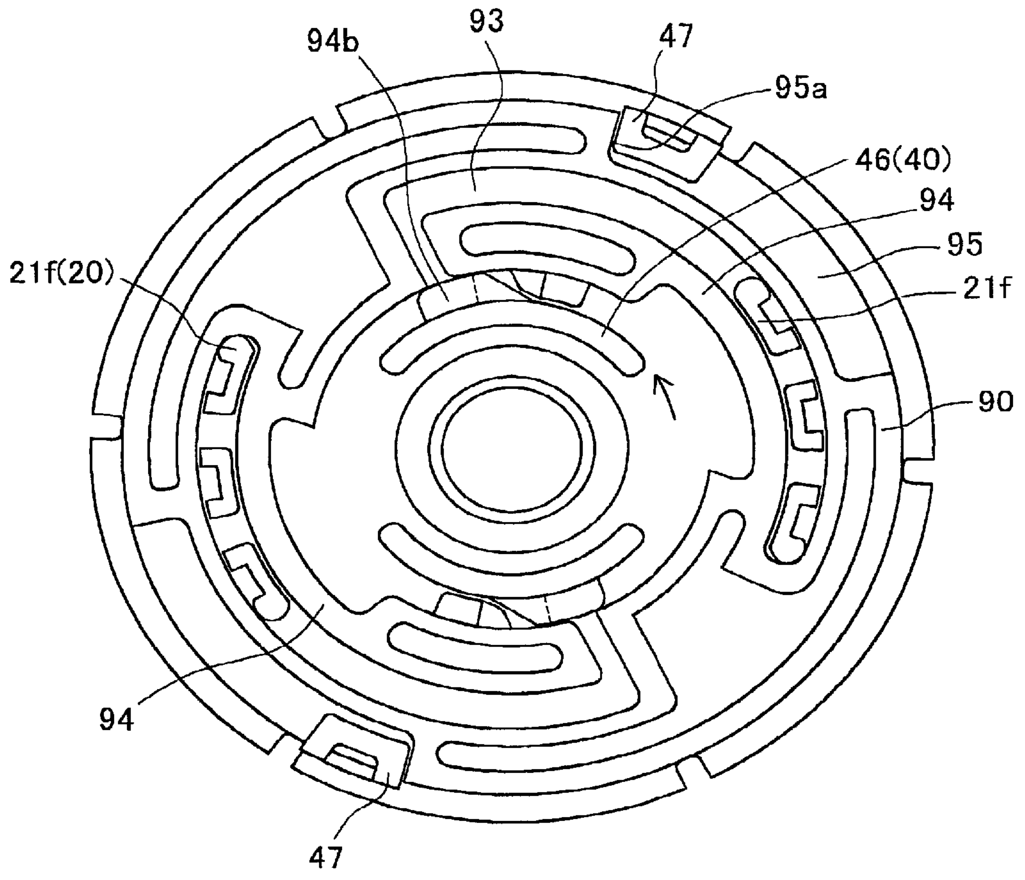
FIG. 13 shows the action continuing from that of FIG. 12.

The following describes operation of the torque mechanism 80 in the process of opening and closing the fuelling inlet FNb of the filler neck FN with the tank cap 10. FIGS. 7 through 11 show the operation through completion of closing operation with the fuel cap 10 while FIGS. 11 through 13 show the opening operation. Because the torque mechanism 80 has two each of the elastic torque pieces 94, etc. symmetrically formed around the rotational axis of the cover 40, the upper parts of each view are explained mainly.

Figure 7:
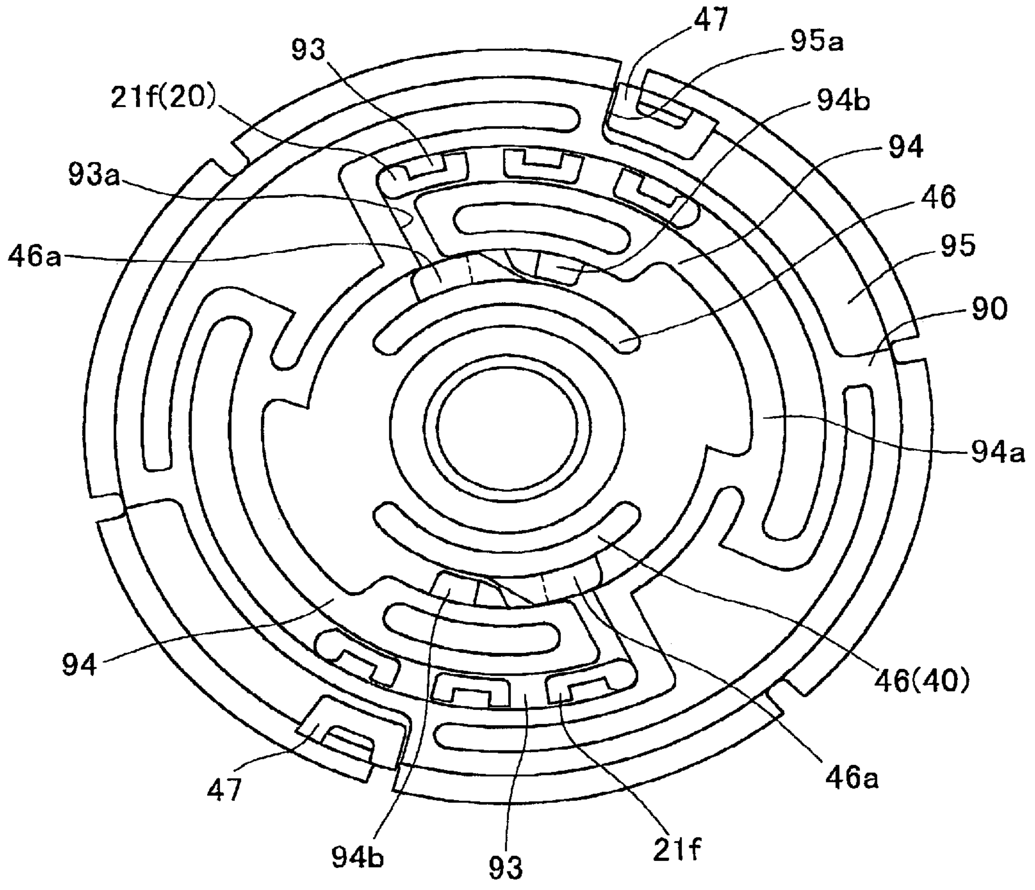
FIG. 7 shows the action of the torque mechanism of the fuel cap.
Figure 8:
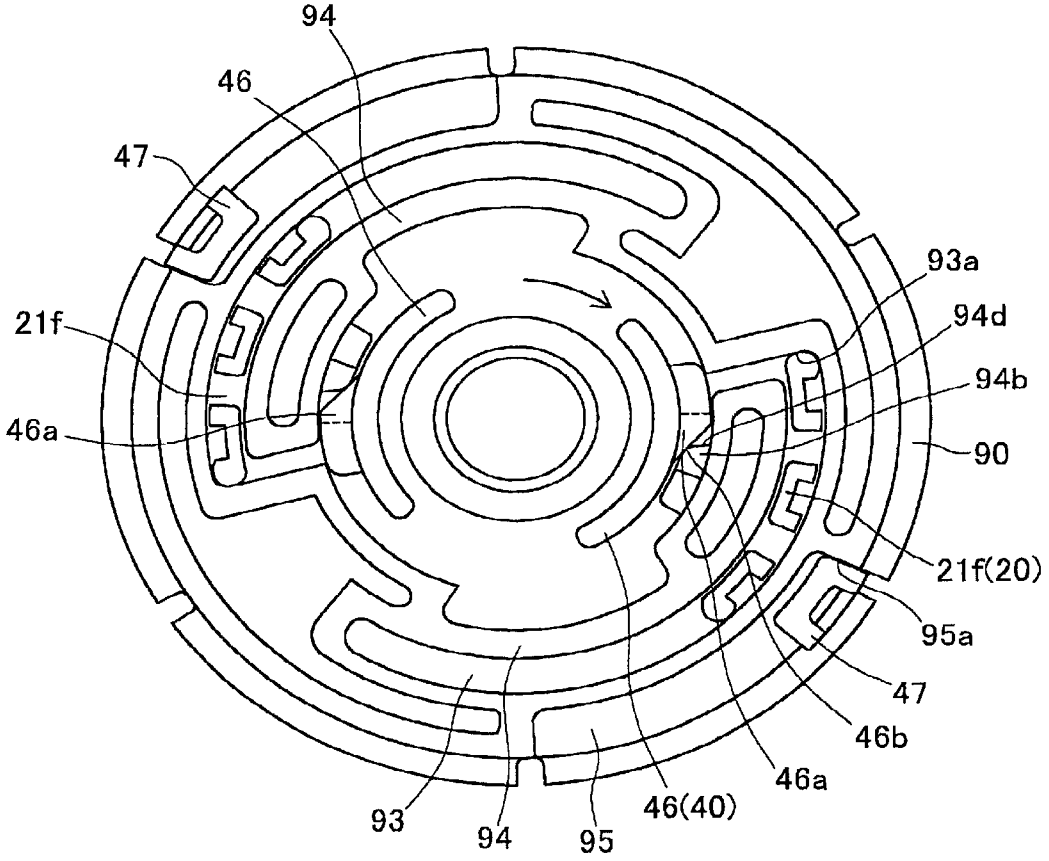
FIG. 8 shows the action continuing from that of FIG. 7.

As shown in FIG. 2, in the state where the fueling inlet FNb is open, the handle 42 is gripped with the thumb and index finger and, aligning the casing engagement element 20*a* of casing main body to the neck insertion notch FNd of the filler neck FN, the casing main body 20 is inserted in the fueling inlet FNb in the axis direction. In this case, by pointing the handle 42 in the perpendicular direction, the casing engagement element 20*a* and the neck insertion notch FNd will be aligned in a position that enables insertion of the casing main body 20. This positioning relationship enables the fuel cap 10 to be affixed easily. As shown in FIG. 7, the positional relationship of the torque mechanism 80 is that the main body rib 21*f* is pushed against the first end 93*a* by the pressing force of first spring 82 (FIG. 1), and the handle engagement element 46*a* contacts the torque piece engagement element 94*b* of the torque plate 90.

Figure 9:
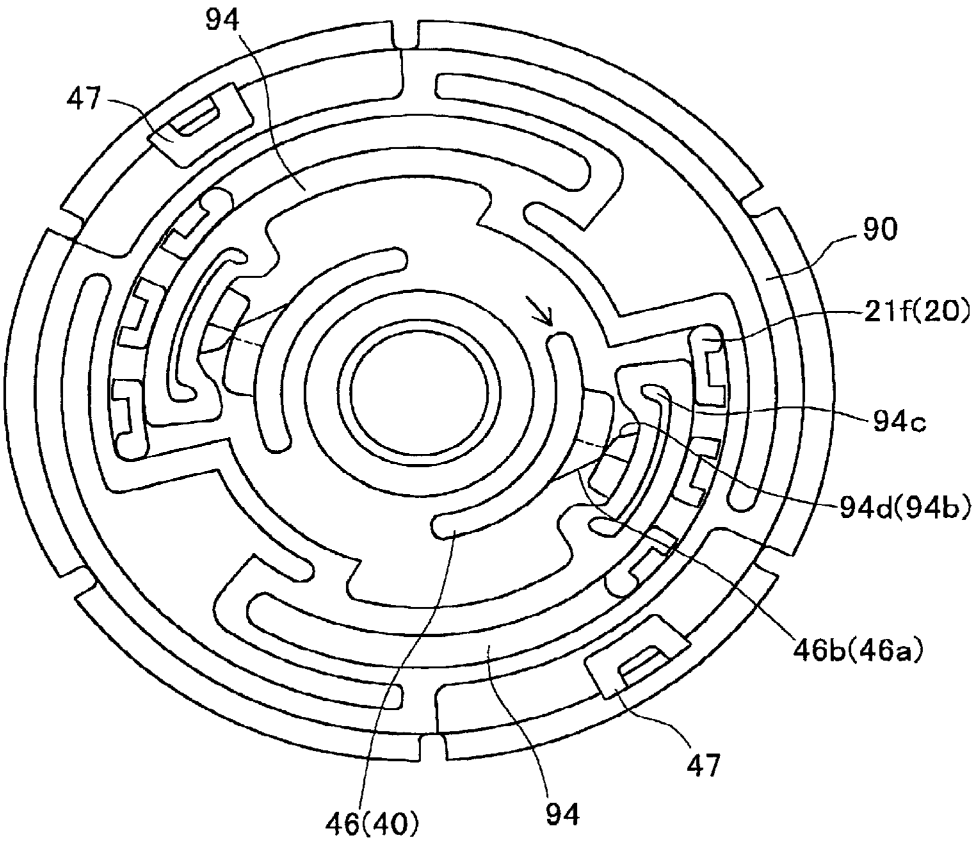
FIG. 9 shows the action continuing from that of FIG. 8.
Figure 10:
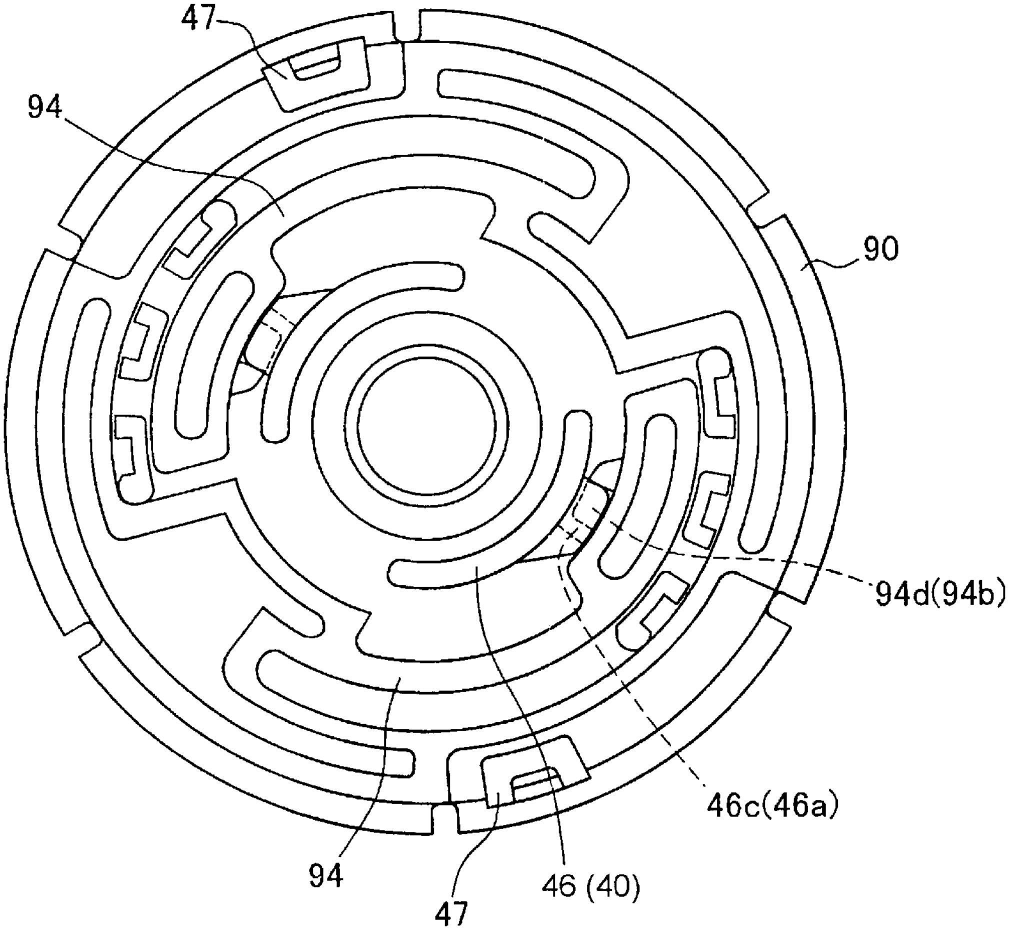
FIG. 10 shows the action continuing from that of FIG. 9.

From this state, to perform the closing operation, applying rotating force to the cover 40 in the clockwise direction, the torque mechanism 80 executes a sequence of actions as shown in FIGS. 8, 9, 10, and 11. That is, the clockwise direction rotating force applied to the cover 40 rotates the torque plate 90, through the engagement of the handle engagement element 46*a* of the cover 40 with the torque piece engagement element 94*b* of the torque plate 90, rotating the torque plate 90 in the same direction. Accompanying the rotation of the torque plate 90, the main body rib 21*f* of the casing main body 20 is pushed by the first end 93*a* of the torque plate 90. As a result, the cover 40, the torque plate 90, and the casing main body 20 rotate as one unit, proceeding in the direction of closing the fueling inlet FNb, and the force with which the casing engagement element 20*a* engages with the opening engagement element FNc increases. Then, when the reaction force generated by this engaging force exceeds the predetermined rotational torque, as shown in FIG. 9, the handle engagement element 46*a* rides over the torque piece engagement element 94*b*, and goes into the first disengagement state of FIG. 10.

Figure 6A:
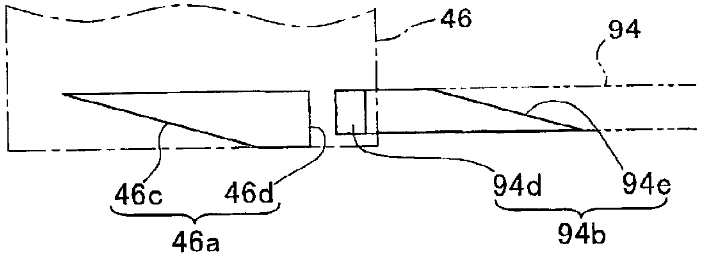
FIG. 6A, FIG. 6B, FIG. 6C and FIG. 6D show the operation and effect of the torque mechanism.
Figure 6B:
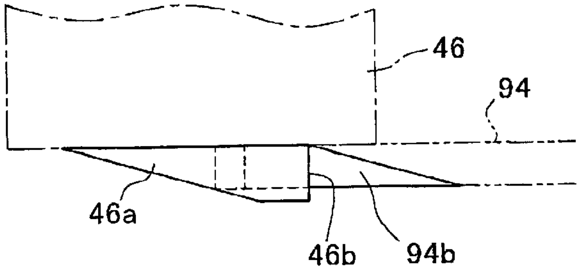
Figure 6C:
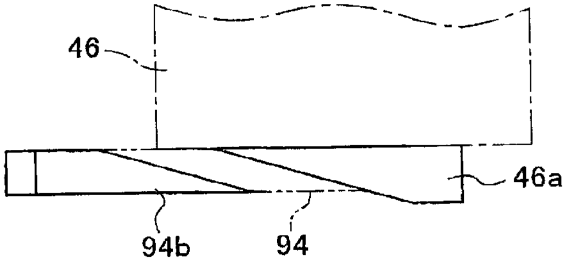

At this time, because the handle engagement vertical surface 46*b* of the handle engagement element 46*a* pushes on the engaging vertical surface 94*d* in the radial direction, the elastic torque piece 94 elastically deforms, changing the width of the slot 94*c*. In this case, as shown in FIGS. 6A and 6B, the elastic torque piece 94 maintains its position in the horizontal plane. Upon passing through first non-engaged state, the user can confirm a feeling of moderated resistance. In this way, the fuel cap 10 goes into the state where the fueling inlet FNb has been closed with the predetermined tightening torque.

In this way, when the handle engagement element 46*a* rides over the torque piece engagement element 94*b*, in other words, when the cover 40 turns relative to the torque plate 90, the first spring 82 spanning is also wound by approximately 30 degrees and accumulates the pressing force.

Figure 6D:
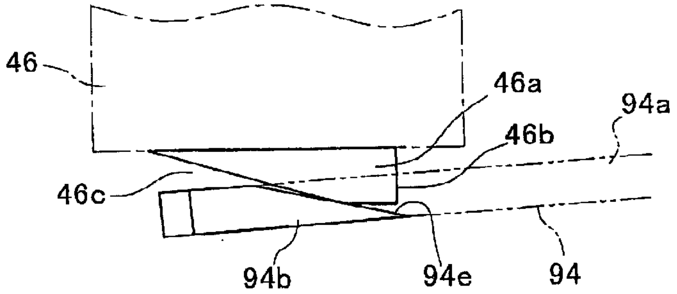

Then, the pressing force accumulated in the first spring 82 causes the cover 40 to rotate in the counter-clockwise direction when the operator's hand releases the handle 42 (FIG. 2). When the pressing force in first spring 82 turns the cover 40 in the counter-clockwise direction as shown in FIG. 6D, the engaging inclined surface 46*c* of the handle engagement element 46*a*, following the engaging inclined surface 94*e* of the torque piece engagement element 94*b*, pushes the elastic torque piece 94 downward with the support end 94*a*. Then, the handle engagement element 46*a* easily rides over the torque piece engagement element 94*b* and goes into the second non-engaged state (the state shown in FIG. 11).

That is, the handle engagement element 46*a* rides over torque piece engaging using a smaller rotational torque than that for the case of tightening the fuel cap 10. At this time, the cover 40 itself returns in the counter clockwise direction and the handle 42 returns to a position of approximately 100 degrees. In this state, the fuel cap 10 has closed the fueling inlet FNb.

Moreover, in this state, the cover 40 can have lost motions within the range that the main body ribs 21*f* can travel within the rib guides 93.

On the other hand, to open the fuel cap 10, the handle 42 of the cover 40 is gripped with the fingers and rotating pressure is applied to turn it in the counter-clockwise direction from the state shown in FIG. 11. In this way, the handle trigger protrusion 47 presses against the first end 95*a* of the trigger guide slot 95 and linked to the cover 40, the torque plate 90 rotates. In this case, the casing main body 20 is restrained by engagement with the filler neck FN, so only the cover 40 and the torque plate 90 rotate in the counter-clockwise direction against the pressing force of the second spring 83 (the state shown in FIG. 12). As a result, accompanying this rotation, the main body rib 21*f* transitions relatively, within the rib guide 93, to the second end 93*b*. When the main body rib 21*f* comes into contact with the second end 93*b*, the rotational force applied to the cover 40 is transmitted via the handle trigger protrusion 47, the torque plate 90, the second end 93*b*, the main body rib 21*f*, and the casing main body 20, and the cover 40, the torque plate 90 and the casing main body 20 rotate in the counter-clockwise direction as one unit.

When the casing main body 20 has rotated 90 degrees as one unit with the cover 40 (the state of FIG. 13), the casing engagement element 20*a* disconnects from opening engagement element FNc of the filler neck FN and is released from the restraining force relative to the filler neck FN. At this time, the casing main body 20 receives the pressing force of the second spring 83 between the casing main body 20 and the torque plate 90. On the other hand, because the cover 40 is restrained, being held by the fingers of the operator, the casing main body 20 returns to the original position rotating counter-clockwise relative to the cover 40 and the torque plate 90 (the state of FIG. 7). In other words, the positional relationship of the handle 42 of the cover 40 and the casing engagement element 20*a* of the casing main body 20 returns to the initial state.

In this way, in the operating sequence for tightening the fuel cap 10, when the handle engagement element 46*a* rides over the torque piece engagement element 94*b* of the torque plate 90, a feeling of reduced resistance could be confirmed and it was clear that the fuel cap 10 had been tightened with the predetermined value of torque. Thus, regardless of the elasticity of parts such as the gasket GS, the cap 10 can be tightened down with a set torque.

Moreover, since the fuel cap 10, through the engagement of the casing engagement element 20*a* and opening engagement element FNc, need only operate through the small rotational angle of approximately 90 degrees, the action of rotating the cap multiple turns is not needed and the operation of mounting and tightening the cap is easy.

Since, after tightening the fuel cap 10, when the user releases his grip from the handle 42 and the cap 10 goes into second non-engaged state through the pressing force of the second spring 83. Then, as shown in FIG. 6D, the engaging inclined surface 46*c* of the handle engagement element 46*a* pushes on the engaging inclined surface 94*e* of the torque piece engagement element 94*b*, and the elastic torque piece 94, in the piece holding state, deforms in the downward direction under just a small force. As a result, the cover 40 can return from the first non-engaged state to the second non-engaged state under a small force, making it easy to return the to second non-engaged state and enabling reduction of the noise produced at that time. Moreover, upon completion of tightening down of the cap, since the cap 20 is returned to the second non-engaged state through the pressing force of the second spring 83, when the user opens the cap, the noise usually generated by the operation of rotating the cap does not occur. Because of this and the fact that it is not necessary to return the cap manually to the second non-engaged state, excellent operability is provided.

In addition, according to the torque mechanism 80, when the handle 42 is rotated in the counter-clockwise direction to open the fuel cap 10, the positional relationship of the cover 40 and the casing main body 20 is returned to its initial state through the pressing force of the second spring 83 and the fuel cap 10 can be removed from the filler neck FN. As a result, whenever closing the opening with the fuel cap 10, alignment of the handle 42 of the cover 40 and the casing engagement element 20*a* of the casing main body 20 becomes easy and the task of mounting and tightening the cap 20 into the fueling inlet FNb is simplified.

Moreover, the present invention is not limited to the above-mentioned embodiment. Various embodiments are possible within the scope of the essential points of the invention. For example, the following kinds of embodiments are possible.

(1) In the above-mentioned implementation, the elastic torque piece 94 is formed to narrow the slots 94*c* in the first non-engaged state the slots 94*c*, and to tilt with the support end 94*a* in second non-engaged state. However, the mechanism need not be limited to this configuration. The elastic torque piece may deform elastically in both the radial direction and the vertical direction such that the mechanical flexing stiffness is different in the radial direction and vertical direction.

Figure 14:
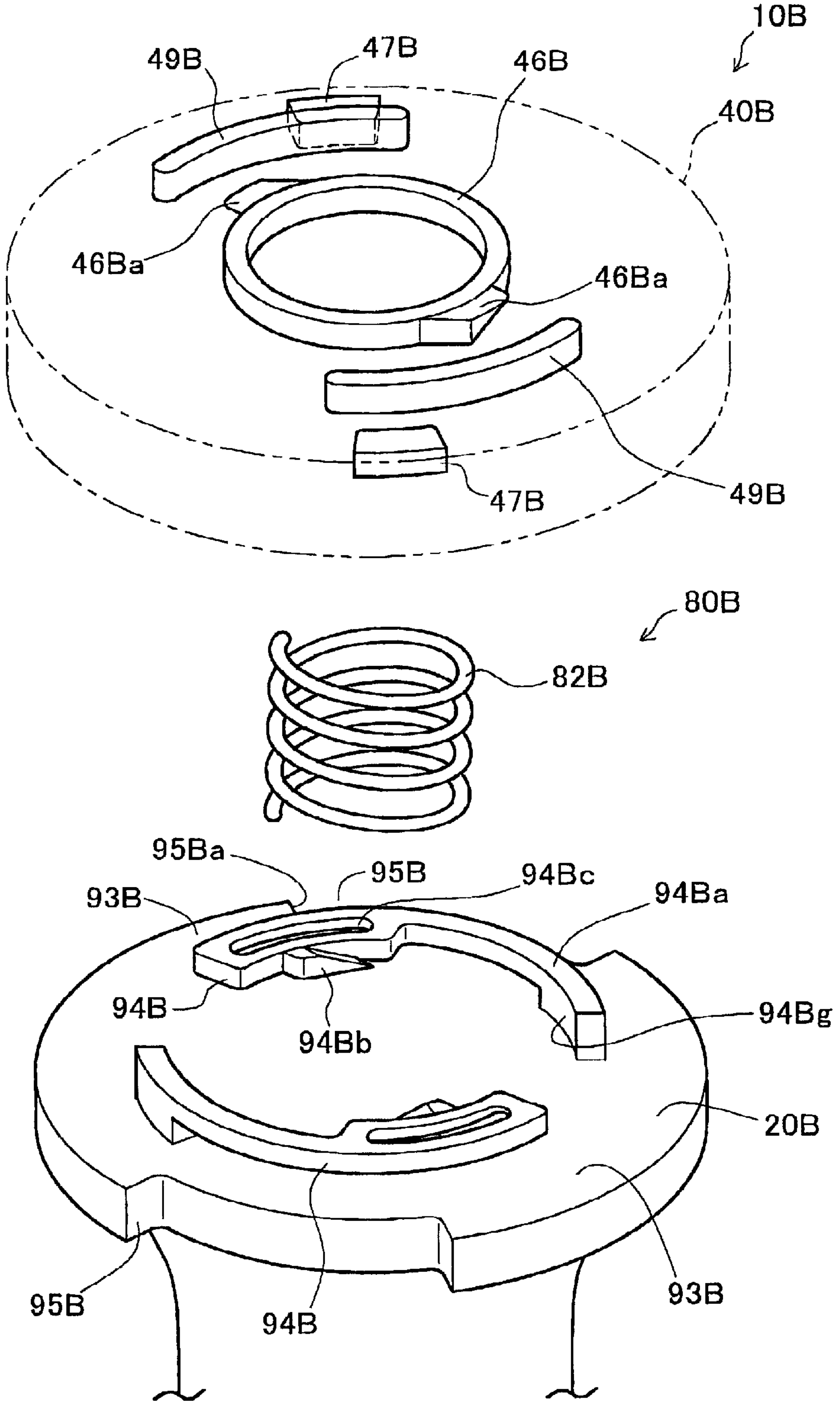
FIG. 14 is an oblique view exploded view showing the fuel cap according to a second embodiment of the present invention.
Figure 15:
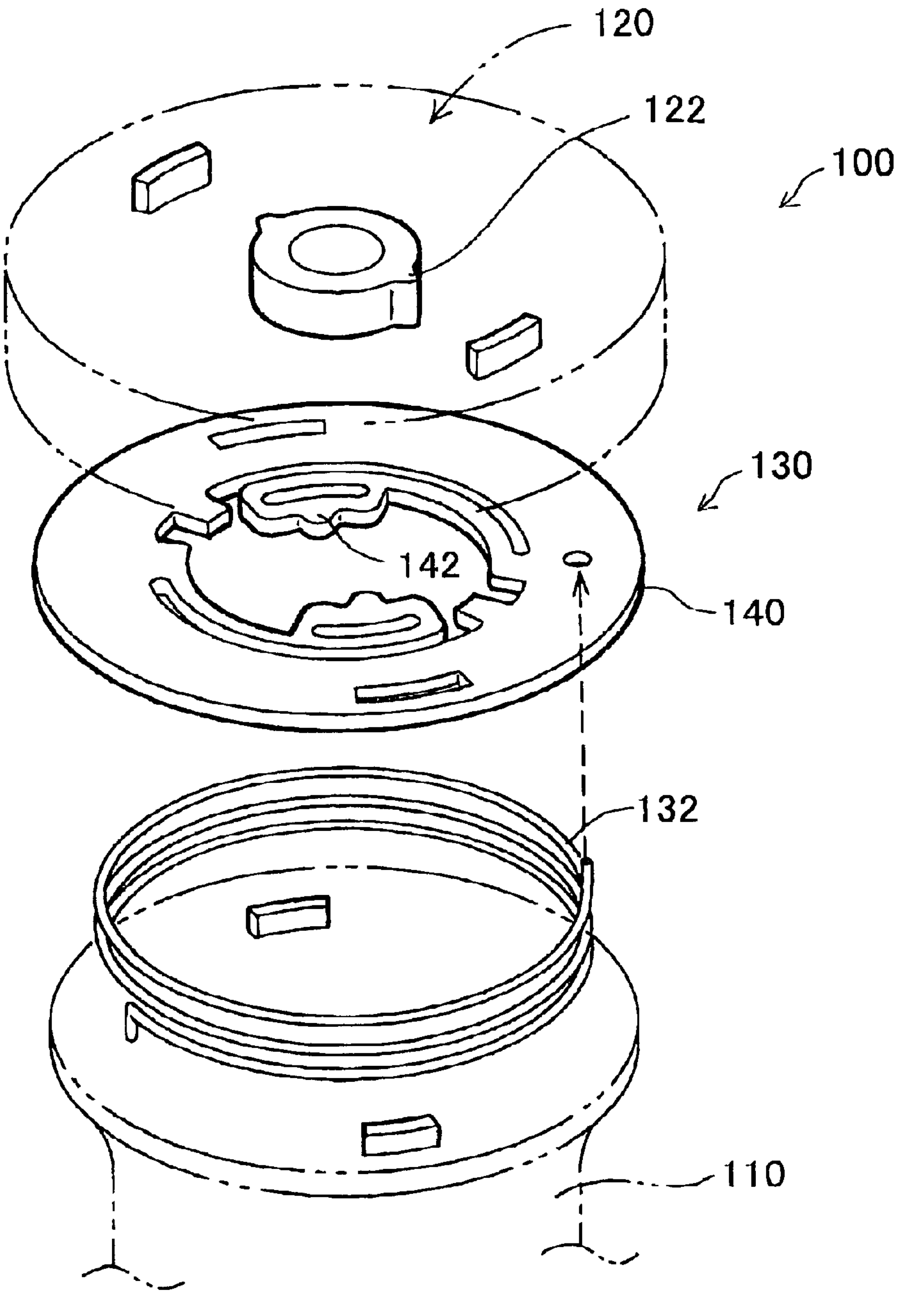
FIG. 15 is an oblique view exploded view showing the fuel cap torque mechanism according to a prior art.

(2) FIG. 14 is an oblique-view exploded drawing showing the fuel cap according to another embodiment. In this embodiment, a torque mechanism 80B comprises elastic torque pieces 94B and 94B integrally formed with a casing main body 20B. The elastic torque piece 94B has a leg 94Bg, projecting vertically from the upper surface of the casing main body 20B. The elastic torque piece 94B extends from the upper part of the leg 94Bg in the circumferential direction with a predetermined gap relative to the upper surface of the casing main body 20B. A rib guide 93B is disposed peripheral to the elastic torque piece 94B and further. On the outer edge of the casing main body 20B, a trigger guide notch 95B is positioned. A cover 40B comprises an annularly-shaped turning part 46B having handle engagement elements 46Ba and 46Ba, handle trigger protrusions 47B and 47B, and handle ribs 49B and 49B. The handle rib 49B corresponds to the main body rib 21*f* of FIG. 3.

When the handle engagement element 46Ba has engaged with a torque piece engagement element 94Bb, and the handle rib 49B is positioned in the rib guide 93B. As a result, the elastic torque piece 94B is restricted to be deformed in the circumferential direction, the elastic torque piece 94B elastically deforms a slot 94Bc. Then, when the handle engagement element 46Ba rides over the torque piece engagement element 94Bb, the spring accumulates pressing force, and when the handle engagement element 46Ba engages the torque piece engagement element 94Bb, through the restoring force of the spring 82B, the elastic torque piece 94B is pushed down, with the support end 94Ba as a fulcrum, the handle engagement element 46Ba rides over the torque piece engagement element 94Bb.

In the above-mentioned embodiment, since the elastic torque piece 94B of the torque mechanism 80B is integrally formed with the casing main body 20B, the number of parts can be reduced.

Since when the handle engagement element 46Ba rides over the torque piece engagement element 94Bb through the returning force of the spring 82B, the handle trigger protrusion 47B comes into contact with the end 95Ba of a trigger guide notch 95B and the cover 40B and the casing main body 20B go into a state where they can rotate as one unit, the lost motion described in FIGS. 11 and 12 does not occur, the operating angle for rotating the cover 40B can be kept small.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank cap configured to open and close a tank opening and to engage with an opening engagement element disposed on a circumference of the tank opening, the tank cap comprising:

a casing main body for sealing the tank opening, the casing main body including a casing engagement element configured to engage with the opening engagement element via rotation of the casing main body by a predetermined angle;

a handle rotatably mounted on the casing main body; and a torque mechanism interposed between the handle and the casing main body, the torque mechanism including (i) a handle engagement element disposed on a lower portion of the handle and (ii) an elastic torque piece with a torque piece engagement element engaging with the handle engagement element, the elastic torque piece configured to transmit rotational torque applied to the handle to the casing main body, wherein:

when a first rotational force is applied to the handle by a user in a first rotational direction in order to attach the casing main body in the tank opening, the handle engagement element engages with the torque piece engagement element, and then the elastic torque piece is deformed to release the engagement between the handle engagement element and the torque piece engagement element when the first rotational force causes a first stress exceeding a first value between the handle engagement element and the torque piece engagement element;

when a second rotational force is applied to the handle in a second rotational direction opposite from the first rotational direction, the handle engagement element engages with the torque piece engagement element, and then the elastic torque piece is deformed to release the engagement between the handle engagement element and the torque piece engagement element when the second rotational force causes a second stress exceeding a second value between the handle engagement element and the torque piece engagement element, the second value being less than the first value, and the direction of the first stress being different from that of the second stress; and the first force is applied to the torque piece engagement element in a radial direction relative to an axis of the tank cap, and the second force is applied to the torque piece engagement element in the axial direction.

2. A tank cap configured to open and close a tank opening and to engage with an opening engagement element disposed on a circumference of the tank opening, the tank cap comprising:

a casing main body for sealing the tank opening, the casing main body including a casing engagement element configured to engage with the opening engagement element via rotation of the casing main body by a predetermined angle;

a handle rotatably mounted on the casing main body; and a torque mechanism interposed between the handle and the casing main body, the torque mechanism including (i) a handle engagement element disposed on a lower portion of the handle and (ii) an elastic torque piece with a torque piece engagement element engaging with the handle engagement element, the elastic torque piece configured to transmit rotational torque applied to the handle to the casing main body via engagement between the handle engagement element and the torque piece engagement element, wherein:

the torque piece engagement element is configured to be selectively put in one of an engagement state, a first non-engaged state, and a second non-engaged state;

in the engagement state, the torque piece engagement element engages with the handle engagement element so that the rotational torque applied to the handle is transmitted to the casing main body via the elastic torque piece when the handle is rotated in a closing direction of the tank opening;

in the first non-engaged state, the torque piece engagement element is released from the handle engagement element with a first force due to a first rotational torque when the torque piece engagement element engages with the handle engagement element, and then the handle is rotated in the closing direction of the tank opening; and in the second non-engaged state after being in the first non-engaged state, the torque piece engagement element is released from the handle engagement element with a second force due to a second rotational torque when the torque piece engagement element engages with the handle engagement element, and then the handle is rotated in the opening direction of the tank opening, a direction of the second force being different from that of the first force, and the second force being less than the first force; and the first force is applied to the torque piece engagement element in a radial direction relative to an axis of the tank cap, and the second force is applied to the torque piece engagement element in the axial direction.

3. The tank cap as claimed in claim 2, wherein:

the handle engagement element includes a first engaging vertical surface, and the torque piece engagement element includes an engaging vertical surface conforming to the engaging vertical surface, the elastic torque piece being configured to be deformed by the first force when the handle is rotated in the closing direction; and the handle engagement element includes an engaging inclined surface inclined by a predetermined angle relative to the axial direction, and the torque piece engagement element includes an engaging inclined surface conforming to the engaging inclined surface, the elastic torque piece being configured to be deformed by the second force when the handle is rotated in the opening direction.

4. The tank cap as claimed in claim 2, wherein the elastic torque piece is a cantilevered piece, the cantilevered piece being configured to deform more significantly in the second non-engaged state than in the first non-engaged state when the torque piece engagement element is pressed against the handle engagement element.

5. The tank cap as claimed in claim 2, wherein the torque mechanism includes a torque plate interposed between the handle and the casing main body, the elastic torque piece having the torque piece engagement element.

6. The tank cap as claimed in claim 5, wherein the torque mechanism further comprises a spring, the spring generating a pressing force to return a positional relationship between the handle and the casing main body to an initial state.

7. The tank cap as claimed in claim 6, wherein the spring is a coil spring that accumulates the pressing force when being twisted.

8. The tank cap as claimed in claim 7, wherein the spring is interposed between the handle and the torque plate, the spring accumulating the pressing force in response to a rotation of the handle in the opening direction of the tank opening, the pressing force accumulated in the spring being released so that the first non-engaged state is changed to the second non-engaged state.

9. The tank cap as claimed in claim 7, wherein the spring is interposed between the casing main body and the torque plate, the spring accumulating the pressing force in response to a rotation of the handle in the closing direction of the tank opening, the pressing force accumulated in the spring being released so that the second non-engaged state is changed to the initial state.

10. The tank cap as claimed in claim 2, wherein the elastic torque piece is integrally formed on the casing main body.

11. The tank cap as claimed in claim 10, wherein the elastic torque piece includes a leg projecting from an upper portion of the casing main body and a cantilevered arm integrally formed with an upper portion of the leg, the cantilevered arm being disposed to have a gap between the cantilevered arm and the casing main body.

12. The tank cap as claimed in claim 2, wherein the tank opening is a fuel supply inlet of a fuel tank mounted on an automobile.

* * * * *